United States Patent
Manser

[11] 3,861,287
[45] Jan. 21, 1975

[54] EXTRUDER DEVICE FOR PREPARING FOODSTUFFS

[75] Inventor: Josef Manser, Uzwil, Switzerland

[73] Assignee: Gebrueder Buehler AG, Uzwil, Switzerland

[22] Filed: May 11, 1973

[21] Appl. No.: 359,525

[30] Foreign Application Priority Data
May 16, 1972 Switzerland.......................... 7217/72

[52] U.S. Cl...................... 99/348, 99/483, 259/192
[51] Int. Cl. ............................................ A47j 27/14
[58] Field of Search .......... 99/348, 483, 485; 259/5, 259/6, 192, 9, 10, 68, 69, 97, 21, 40

[56] References Cited
UNITED STATES PATENTS
| | | | |
|---|---|---|---|
| 932,789 | 8/1909 | Kritzer................................. | 259/68 |
| 1,307,508 | 6/1919 | Booth ................................... | 99/348 |
| 1,949,374 | 2/1934 | Johnson....................... | 259/DIG. 18 |
| 2,494,891 | 1/1950 | Marshall............................. | 259/192 |
| 2,639,898 | 5/1953 | Reich................................... | 259/68 |

*Primary Examiner*—Robert W. Jenkins
*Attorney, Agent, or Firm*—Browdy & Neimark

[57] ABSTRACT

An extruder device for manufacturing foodstuffs, especially snacks, of the puffed and non-puffed varieties comprises a mixing feed screw, a cooking feed screw, and a cooling feed screw. The feed screws are so arranged that the prepared foodstuffs may be expelled from the apparatus after leaving the cooking feed screw, thereby bypassing the cooling feed screw.

10 Claims, 6 Drawing Figures

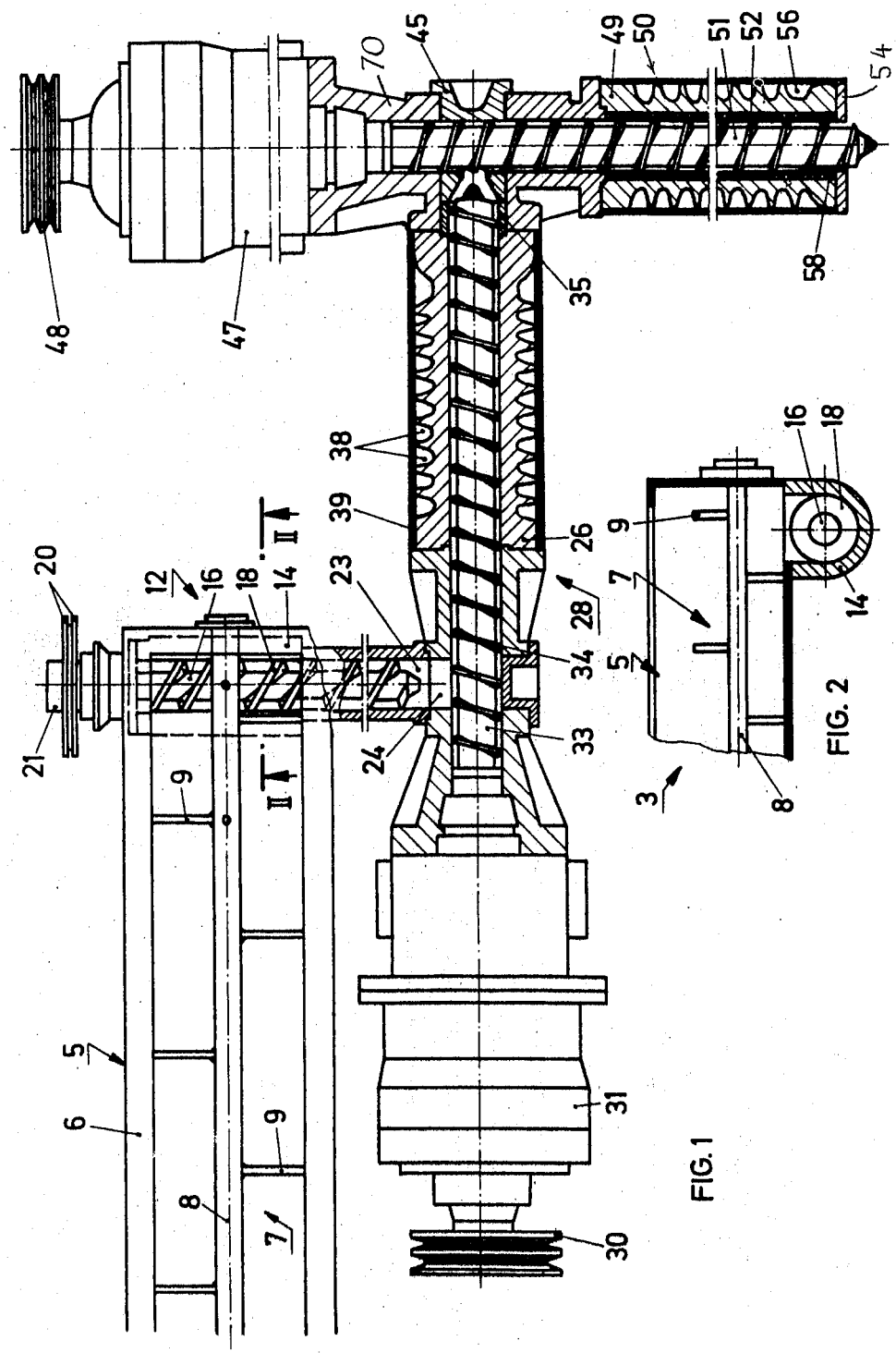

EXTRUDER DEVICE FOR PREPARING FOODSTUFFS

FIELD OF THE DISCLOSURE

The present invention relates to an extruder device for preparing foodstuffs, especially snacks, dog food, flakes and crispies of both the puffed and non-puffed varieties, comprising at least one cooking and at least one cooling feed screw.

BACKGROUND OF THE INVENTION

Snack products currently come in a variety of shapes and compositions. In addition, a relatively large and constant turnover is evident in the various shapes and compositions of these products.

There is a widespread feeling in the industry that the somewhat complicated chemical and physical processes involved in the preparation of snacks, especially in regard to puffed and non-puffed varieties, can be carried out only with several, but at least two different and specially built machines.

There are in fact some devices that can produce puffed and non-puffed products on the same machine. In these machines the product moves in a continuous stream from the cooking zone directly to the cooling zone. In these prior machines there is a highly disadvantageous limitation, namely, that only specially selected raw materials are processed and that only a small portion of the various snacks can be produced on a given machine.

Also, prior art cooking and cooling feed screws used for making snacks are provided with relatively shallow threads. The mass between the core of the screw and the internal diameter of the housing is almost always very small. Originally, the development of production techniques for foods, due to an incorrectly understood analogy between the manufacture of snacks and other foods such as pastries, the familiar palette or feed-screw cookers were used, sometimes even with pins in them. Such prior art devices could produce acceptable snacks for a few hours. However, suddenly and without any external cause, perhaps due to a rise in temperature, snacks with altered odor or color (and hence useless) were produced.

SUMMARY OF THE INVENTION

The present invention provides a device which overcomes the shortcomings of the prior art foodstuff preparing devices. Thus, an object of the present invention is to overcome the defects of the prior art devices indicated above.

Another object of the present invention is to provide for the improved production of various snack foods.

Another object of the present invention is to provide a simple extruder device which can actually process all the snacks currently available on the market and also offers a great many variations for making future products.

A further object of the present invention is to provide an extruder device which may be easily cleaned and sanitized.

Yet another object is to provide an extruder device which allows the entire snack preparation process to be carried out with high quality.

A still further object is to provide a highly portable extruder which may be easily handled and operated.

In furtherance of these and other objects, a principal feature of the present invention is a simple extruding machine comprising feed screws which are mounted at an angle to each other. Another feature of the invention is that the product may, as desired, be processed by the cooling feed screw or expanded directly after it leaves the cooking feed screw.

For this purpose a very simple machine which makes it possible to perform each function optimally has been devised. Also, the transfer of the cooked snack product into the independently functioning cooling feed screw does not have a negative effect on the sensitive processing procedure.

Another feature of the instant invention is an extruder which is provided with cutting means, feed elements, and a base, the cutting means being adjustably connected to the extruder. Still another feature is an extruding device which may be heated or cooled. A further feature is an extruder device wherein all uncontrollable flows, in the deep feed screw passages, etc., are eliminated and likewise "passageways" that are not called for by the method are eliminated during processing since it is well known that masses of dough exhibit to some extent very unusual flow behavior.

A still further feature of the instant invention is the intensive kneading process in the snack making feed screws. Not only does the intensive kneading produce a product of extremely good homogeneity, but it is also one of the major reasons why the additional passageways of the present invention are not disadvantageous.

In an especially advantageous embodiment of the invention, means are provided to expel the product after it leaves the cooking feed screw, to mold it, and to bypass the cooling feed screw. These means can employ a heat exchange operation. Such a device may also be provided with a perforation in the heat feed screw which expels the product only after it has been molded.

Despite fears that undersirable changes might occur as a result of the lengthening of the feed path, this has not occurred in the present invention; thus, in one example it has been possible to produce normal expanded dog food in the laboratory on an industrial scale, with flavor and color unaffected.

BRIEF DESCRIPTION OF THE DRAWING

FIG. 1 is a partial cross-section of an extruder device used for preparing a cooled, unpuffed product with a mixing trough ahead of it, and a feed screw.

FIG. 2 is a section along line II—II in FIG. 1.

FIG. 4 is a lengthwise section through a part of an extruder device used for direct expulsion, without deflection, with a connecting piece and cutting device added on.

Figure 4:
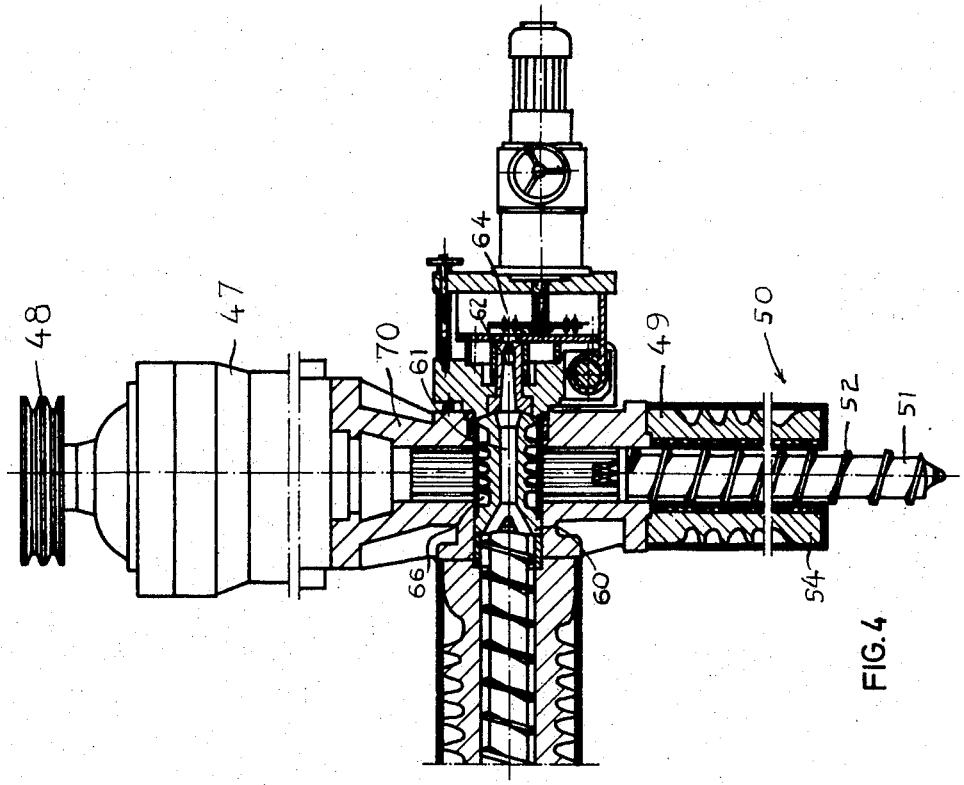

For a better understanding of the invention a possible embodiment thereof will now be described with reference to the attached drawing, it being understood that this embodiment is to be intended as merely exemplary and in no way limitative.

DETAILED DESCRIPTION

Noting FIG. 1, it seems that the device comprises four sections: a mixing section 5, a feeding section 12, a cooking section 28 and a cooling section 50.

The mixing section 5 comprises a tubular shell having a mixing trough 6 and containing a rotor 7 which comprises a shaft 8 and mixing paddles 9. Ingredients to be mixed are placed in the trough and the rotor 7 is turned to effect blending and mixing of the various ingredients into a homogeneous mixture.

The feeding section 12 is located at the outlet of the mixing section 5, and comprises a housing 14 and a helical rotor or feed screw consisting of a cylindrical shaft 16 and a multiple-thread helical control surface 18. The feed screw, oriented in the vertical attitude, is driven from its upper end 21 by means of a flanged driven pulley 20.

Referring to FIGS. 1 and 2, material is fed to the cooking section 28, described below, through the feeding section 12, which pulls the mixture of components from the mixer 5. This mixture passes through an opening between the mixer 5 and the feeder 12, the size of which can be varied by means of a slide (not shown), and enters the feed screw chamber 14. Here a helical rotor 16–18 is turned or rotated to drive the mixed material downwardly. (See: FIG. 2).

Figure 6:
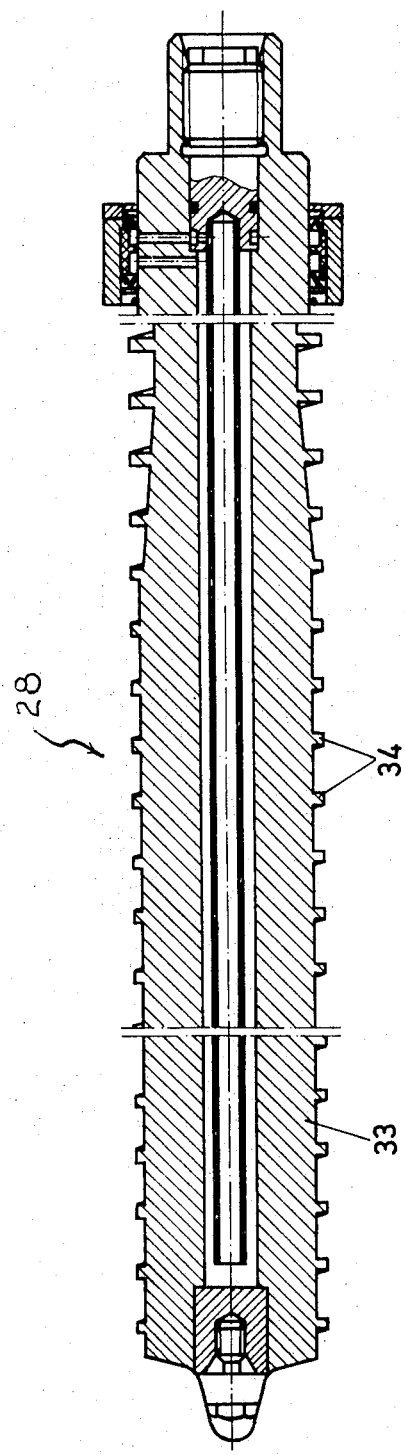
FIG. 6 is a lengthwise section through a snack feed screw.

The cooking section 28 comprises a horizontal housing 28 which contains a rotatable cooking feed screw consisting of a shaft 33 and a threaded surface 34, the details of which are seen in FIG. 6. An opening 23 in the downstream end of the housing 14 of the feed section 12 connects to a feed opening 24 in the upper part of the housing 26. This cooking feed screw 33–34 is driven by a pulley 30 and a suitable drive located in a drive housing 31. At the discharge or downstream end of the feed screw 33–34 a ring 35 is inserted in the housing 26. Such housing 26, which surrounds most of the screw 33, is provided with a helical channel 38 that can be heated or cooled, depending on the products being handled. An outer wall 39 is provided to contain a suitable heat transfer fluid in the channel 38.

Naturally it is also possible to heat or cool the inside of cooking feed screw section 28 so that the products to be handled have the optimum temperature at various points. Much of the cooking heat comes from the friction of feed screw 33–34. Thus the heat developed directly on the surface of the feed screw may have to be lowered by cooling. In this way it is possible to provide separate heating and cooling channels in both housing 26 and inside the shaft 33, in order to heat or cool selected areas, or to do one or the other alternatively. It is understood that the ring 35 is also interchangeable.

The cooling section 50, located at the discharge end of the cooking section 28 adjacent the ring 35, comprises a vertically disposed rotatable screw consisting of a shaft 51 and an integral helical control surface 52, such screw being surrounded by a suitable chamber of housing arrangement described in more detail below and including portions 70 and 49. Housing portion 49 includes a heat transfer channel 56 for cooling fluid.

The cooling feed screw section 50 including a shaft 51 and a multiple-thread helical control surface 52 turns in feed screw housing 49. Directly in front of the outlet of the feed screw housing 49 is an adjustable or removable bucket ring 54 on shaft 51. An extrusion opening 58 fits against bucket ring 54 and leads to the molding sections of the device, which give the end product the desired shape.

The screw 51–52 is driven through a suitable drive mechanism carried within a housing 47, and by a pulley 48 which in turn is driven by a drive belt and motor (not shown). A particular feature of the present construction involves a removable portion of the screw 51–52 and the arrangement of the associated housing.

Figure 3:
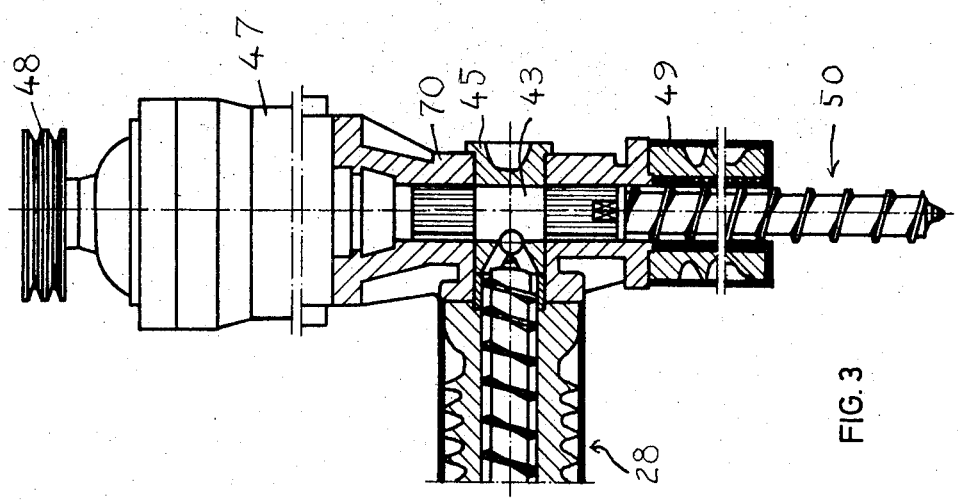
FIG. 3 is a lengthwise section through a part of an extruder device used for preparing a directly expanded product with deflection in the vertical direction.
Figure 5:
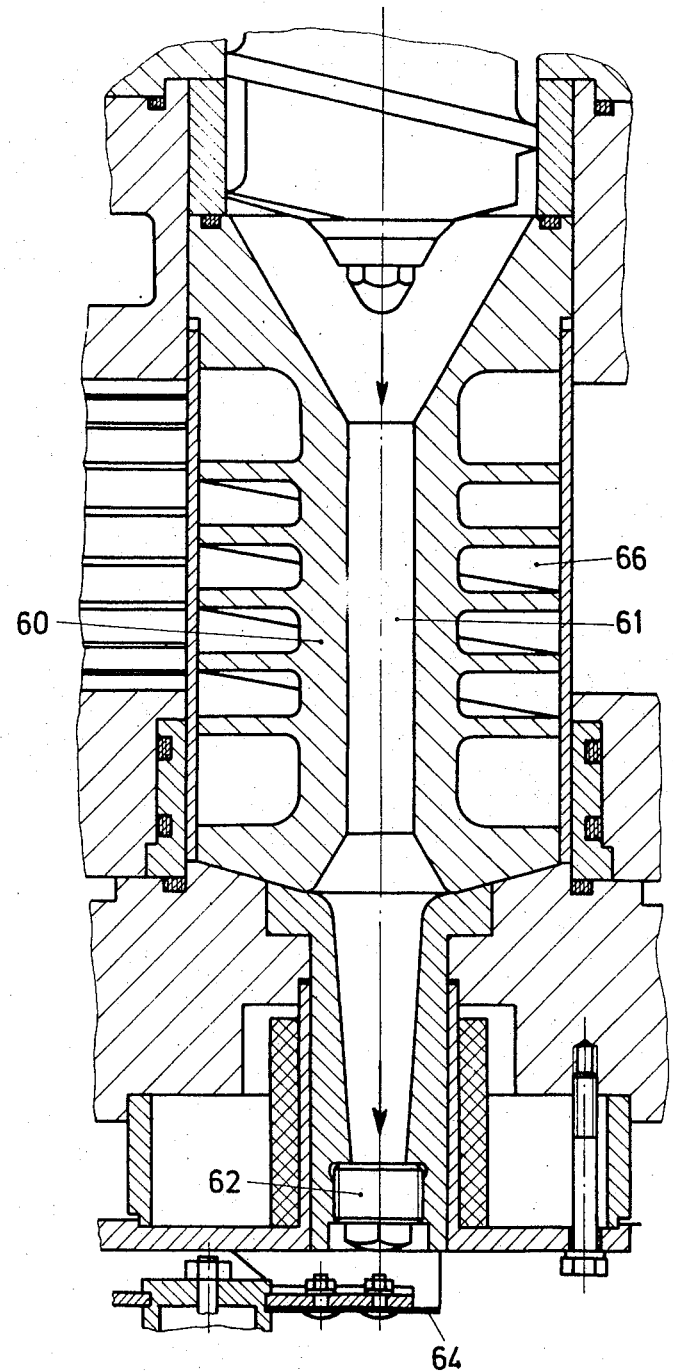
FIG. 5 is a lengthwise section of a connecting piece.

Referring now to FIG. 3, when the cooling section 50 is partially removed, a connecting piece 45 fits onto housing opening 43 of cooker feed screw section 28. In the arrangement shown, the connecting piece is closed at the outlet end, so that the material enters cooling feed screw section 50, whose drive 48 and bearing box 47 are also shown. The housing 70 is connected directly to the connecting piece 45. This connecting piece 45 can be exchanged for another connecting piece 60 (See: FIGS. 4 and 5).

In connecting piece 60, the inlet to the feed screw housing 49 of the cooling feed screw section 50 is closed off and a horizontally mounted outlet is open. This piece 60 makes it possible to press the cooked material after cooking and kneading by way of an intermediate passageway 61 through a nozzle 62 and to cut up the material as it emerges from such nozzle 62, e.g., by means of rotating knives 64 (See: FIG. 5). Thus the product may be expelled after leaving the cooking feed screw section 28, thereby bypassing the cooling feed screw section 50.

It is also possible to turn intermediate passageway 61 through 90° and extrude the product at right angles to the axis of the intermediate connecting piece 60.

The helical outer channel 66 serves to guide the heating medium (See: FIGS. 4 and 5).

In operation, the speed and volume of the forward propelled mass is regulated by varying the rpm of the feed screws; especially the cooking and cooling feed screws 33–34 and 51–52. Thus the product being handled can be produced at a desired temperature under the desired pressure conditions in a desired time. It should be understood that the product is held under pressure and at a temperature such that the water present in the product remains in the form of water. It is only in the case of uncooled extrusion from the cooker feed screw section 28 that water vapor forms in the corresponding connecting piece 60 as the result of a decrease in the pressure. This tends to inflate the product, so that a so-called "expanded" or "puffed" product is the result (See: FIG. 4).

However, if the connecting piece 45 is used, the material processed in the cooker feed screw 28 can be cooled as desired in the cooling feed screw section 50. The result is a non-puffed product (See: FIGS. 1 and 3). The removable bucket ring 54 allows for individual treatment dependent upon the type of product to be prepared. To prepare an ordinarily cooked non-expanded product, one uses cooling feed screw section 50. Even in this operation, friction between the screw 51–52, the housing 49, and the product to be handled develops heat, which must also be carried away. The entire process can be regulated by cooling or additional heating, especially with regard to time.

The production shift from puffed to non-puffed snacks requires changing at least one or two parts of the machine (e.g., feed screws and fittings). Naturally, in the snack manufacturing process the entire machine must be cleaned thoroughly each time the type of product prepared is changed. This may easily be accomplished by withdrawing the feed screws from their housings and washing them thoroughly.

The foregoing description of the specific embodiment will so fully reveal the general nature of the invention that others can, by applying current knowledge, readily modify such specific embodiment and/or adapt it for various applications without departing from the generic concept, and, therefore, such adaptations and modifications should and are intended to be comprehended within the meaning and range of equivalents of the disclosed embodiment.

It should be noted that the position of the axes of the cooking and cooling feed screws in space can easily be adjusted to fit the given conditions and space limitations. Thus, the cooling feed screw can be pointed downward, which makes sense for short cooling feed screws. However, both screws can be mounted horizontally.

Also, it has been shown that in many cases the heating or cooling of the connecting piece can be eliminated during operation, since a heat flow toward the delicate connecting piece occurs between the cooling and heating feed screws. In a directly expanded product, therefore, sufficient heat is transmitted from the adjacent parts to the connecting piece. In the operational state, then, the product does not solidify in the connecting piece. If the snacks produced during the start-up period are considered as a waste, a connecting piece without heating or cooling would suffice.

It is to be understood that the phraseology or terminology employed herein is for the purpose of description and not of limitation.

What is claimed is:

1. An extruder device for manufacturing solid foodstuffs, especially snacks, dog food, flakes or crispies, of the puffed or non-puffed varieties, comprising:
   a mixing means for mixing foodstuff ingredients having a dough-like consistency;
   a transporting means, connected to said mixing means and having an outlet opening, for transporting the foodstuff ingredients from said mixing means to said outlet opening;
   a cooking feed screw means for cooking and transporting the foodstuff ingredients comprising a cooking cylinder having a receiving opening, at one end thereof, disposed on said outlet opening of said transporting means, said cooking cylinder having an internal bore with a first helical rotor internally disposed therein and a discharge opening at the other end thereof;
   a cooling feed screw means for cooling and transporting foodstuff ingredients comprising a cooling cylinder having an inlet opening at one end thereof disposed on said discharge opening of said cooking feed screw means, said cooling cylinder having an internal bore with a second helical rotor internally disposed therein; and
   said cooling cylinder being disposed with the longitudinal axis thereof being inclined to the longitudinal axis of said cooking cylinder.

2. The extruder device of claim 1 comprising a bypass means for bypassing and discharging the foodstuff ingredients from said cooking feed screw means, said bypass means being connected to said cooking feed screw means and said cooling feed screw means at the junction thereof, thereby bypassing said cooling feed screw means for direct discharge.

3. The device of claim 2 wherein said bypass means includes heat exchange means for cooling or heating said bypass means.

4. The device of claim 2 wherein said bypass means are interchangeable.

5. A device in accordance with claim 2 wherein said bypass means is attached directly to said cooling feed screw means adjacent said discharge opening of said cooking feed screw means, and said bypass means further includes:
   a heat exchange portion;
   an exit nozzle adjacent said heat exchange portion;
   a bucket ring disposed on said exit nozzle; and
   a cutter adjacent said bucket ring.

6. The extruder device of claim 1 wherein said cooking feed screw means and said cooling feed screw means further include heat exchange means, connected respectively to said cooking cylinder and said cooling cylinder, for raising and lowering the temperature thereof.

7. The extruder device of claim 6 wherein said cooking and cooling cylinders each include exterior walls and said heat exchange means comprise helical channels disposed within respectively said exterior walls of said cooking and cooling cylinders, said helical channels being capable of handling hot and cold mediums; whereby said cooking and cooling feed screw means may be heated and cooled.

8. The device of claim 1 wherein the longitudinal axis of said transporting means is substantially parallel to the longitudinal axis of said cooling feed screw means.

9. The device of claim 1 wherein said helical rotor means comprise:
   a cylindrical shaft;
   helical threads disposed about said shaft; and
   driving means for rotating said shaft and connected thereto.

10. The extruder device of claim 1 wherein said cooling feed screw means has a discharging end and a replaceable bucket ring is mounted on said discharging end.

* * * * *